United States Patent
Notarianni et al.

(10) Patent No.: US 10,883,374 B2
(45) Date of Patent: Jan. 5, 2021

(54) BLADE COMPRISING A FOLDED LEADING EDGE SHIELD AND METHOD OF MANUFACTURING THE BLADE

(71) Applicant: SAFRAN AIRCRAFT ENGINES, Paris (FR)

(72) Inventors: Gilles Pierre-Marie Notarianni, Brie-Comte-Robert (FR); Jeremy Guivarc'H, Portsmouth, NH (US); Frederic Jean-Bernard Pouzadoux, Melun (FR); Dominique Raulin, Saint Fargeau Ponthierry (FR); Thibault Ruf, Lieusaint (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 11 days.

(21) Appl. No.: 15/763,703

(22) PCT Filed: Sep. 27, 2016

(86) PCT No.: PCT/FR2016/052443
§ 371 (c)(1),
(2) Date: Mar. 27, 2018

(87) PCT Pub. No.: WO2017/055726
PCT Pub. Date: Apr. 6, 2017

(65) Prior Publication Data
US 2018/0274375 A1    Sep. 27, 2018

(30) Foreign Application Priority Data
Sep. 28, 2015 (FR) .................. 15 59127

(51) Int. Cl.
*F01D 5/28* (2006.01)
*F04D 29/32* (2006.01)
*F01D 5/14* (2006.01)

(52) U.S. Cl.
CPC .......... *F01D 5/282* (2013.01); *F01D 5/147* (2013.01); *F04D 29/324* (2013.01);
(Continued)

(58) Field of Classification Search
CPC ......... F05D 2240/303; F05D 2240/121; F05D 2240/125; F05D 2240/15; F05D 2260/36; F01D 5/147; F01D 5/282; B64C 11/205
See application file for complete search history.

(56) References Cited

U.S. PATENT DOCUMENTS

| | | | |
|---|---|---|---|
| 1,545,560 A | 7/1925 | Heath | |
| 3,784,322 A * | 1/1974 | Erich | B64C 11/22 416/229 R |

(Continued)

FOREIGN PATENT DOCUMENTS

| | | |
|---|---|---|
| EP | 0202153 A1 | 11/1986 |
| EP | 2253806 A2 | 11/2010 |

(Continued)

OTHER PUBLICATIONS

International Search Report dated Jan. 23, 2017 in PCT/FR2016/052443 filed Sep. 27, 2016.

(Continued)

*Primary Examiner* — David E Sosnowski
*Assistant Examiner* — Danielle M. Christensen
(74) *Attorney, Agent, or Firm* — Oblon, McClelland, Maier & Neustadt, L.L.P.

(57) ABSTRACT

A blade including a blade body made of organic matrix composite material and a leading edge shield made of a material that withstands point impacts better than the composite material of the blade body. The blade includes a blade tip. The leading edge shield is assembled on the blade body and includes a pressure-side fin and a suction-side fin. The pressure-side fin includes a pressure-side tab and the suc- (Continued)

tion-side fin includes a suction-side tab, the pressure-side tab and the suction-side tab are folded one on the other and being secured to each other so as to form a partial covering of the blade tip. A turbojet includes a fan including such blades, and also a method of fabricating such a blade.

11 Claims, 4 Drawing Sheets

(52) U.S. Cl.
CPC ...... *F05D 2220/36* (2013.01); *F05D 2230/23* (2013.01); *F05D 2240/303* (2013.01); *F05D 2260/36* (2013.01); *F05D 2300/133* (2013.01); *F05D 2300/603* (2013.01); *Y02T 50/60* (2013.01)

(56) References Cited

U.S. PATENT DOCUMENTS

| | | | |
|---|---|---|---|
| 4,712,980 A | 12/1987 | Gely et al. | |
| 5,672,417 A | 9/1997 | Champenois et al. | |
| 5,863,181 A * | 1/1999 | Bost | B64C 11/205 |
| | | | 416/224 |
| 6,102,662 A | 8/2000 | Bost et al. | |
| 8,851,855 B2 * | 10/2014 | James | F01D 5/282 |
| | | | 416/224 |
| 9,482,095 B2 * | 11/2016 | Drane | F04D 29/023 |
| 9,616,629 B2 * | 4/2017 | Fabre | B29C 70/24 |
| 2010/0296942 A1 | 11/2010 | Jevons | |
| 2014/0064964 A1 | 3/2014 | Care et al. | |
| 2015/0104325 A1 | 4/2015 | Yagi et al. | |

FOREIGN PATENT DOCUMENTS

| | | |
|---|---|---|
| EP | 2703605 A2 | 3/2014 |
| EP | 2811144 A1 | 12/2014 |
| JP | 61-258928 A2 | 5/1986 |
| JP | 63-240494 A2 | 10/1988 |
| JP | 2013-155675 A2 | 8/2013 |

OTHER PUBLICATIONS

Combined Office Action and Search Report dated Jan. 29, 2020 in corresponding Russian Patent Application No. 2018114902/06(023253) (with English Translation of Category of Cited Documents), citing document AA therein, 8 pages.

Japanese Office Action issued in Japanese Patent Application No. 2018-515979 dated Aug. 25, 2020, citing references AA and AO-AQ therein (w/ English translation).

* cited by examiner

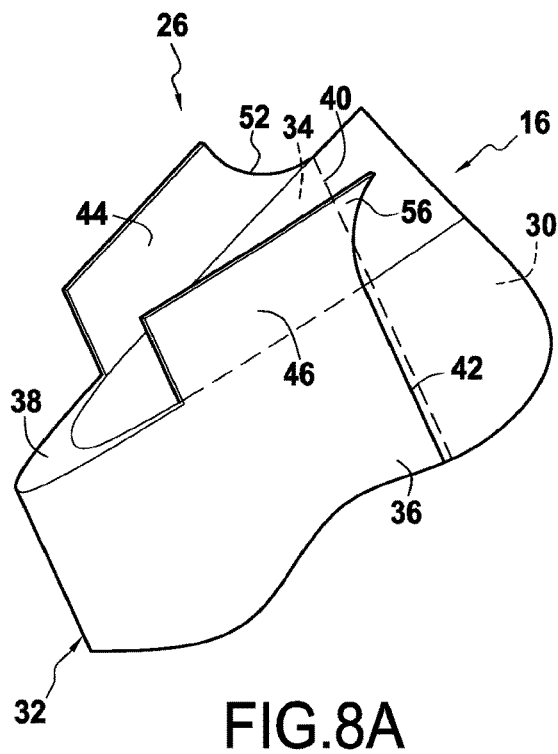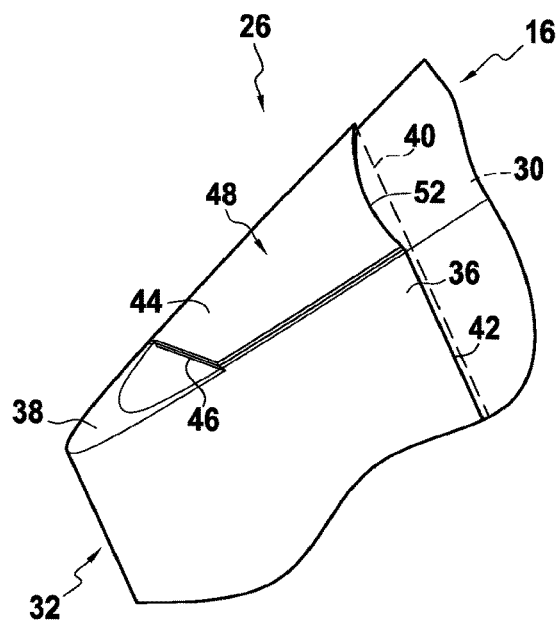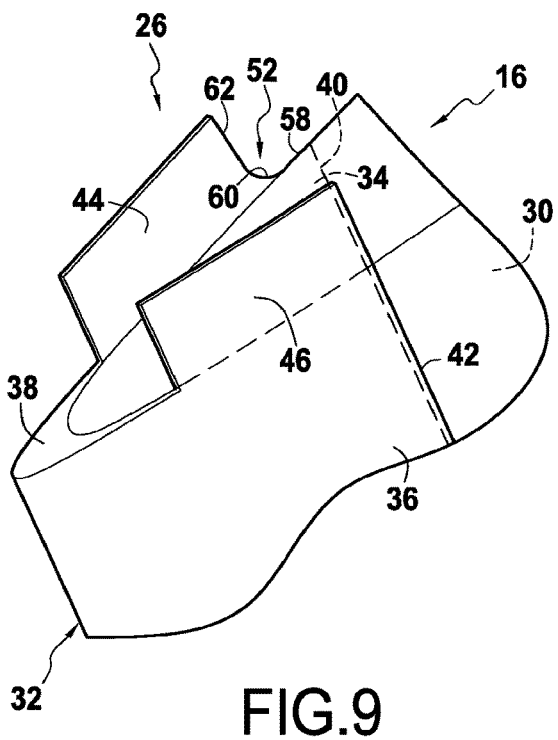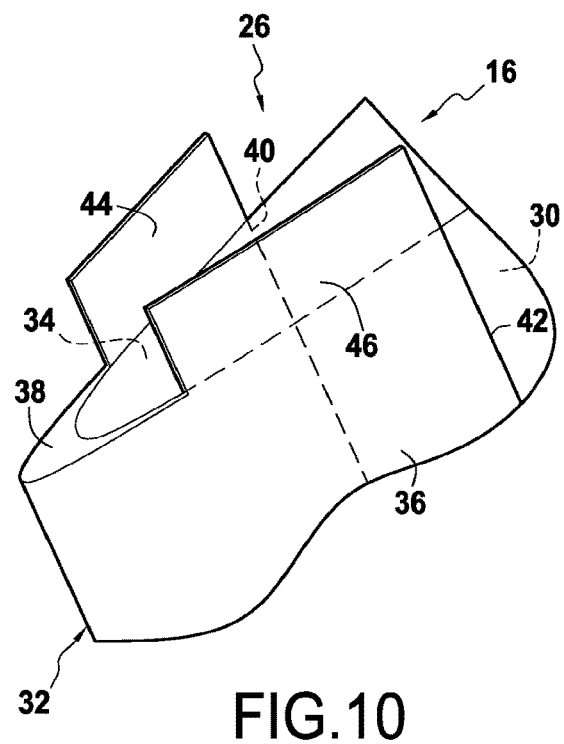

BLADE COMPRISING A FOLDED LEADING EDGE SHIELD AND METHOD OF MANUFACTURING THE BLADE

The present invention relates to a blade made of composite material including a leading edge shield. Such leading edge shields are typically used for protecting the leading edges of rotary blades or of guide vanes against impacts and erosion. The term "blades" is used in this context to cover both fan blades and aircraft propeller blades. In order to limit their weight, such blades are typically made of organic matrix composite material, e.g. fiber-reinforced polymer material. Although such materials present mechanical qualities that are generally very favorable, in particular relative to their weight, they present a degree of sensitivity to point impacts. Shields, typically made of very strong metal material, such as titanium alloys, are thus normally installed on the leading edges of such blades, in order to protect them against impacts. Such shields normally take the form of a fine pressure-side fin and a fine suction-side fin that are joined to together by a thicker section placed astride the leading edge, the shield fitting closely to the shape of the blade on the leading edge and on its adjacent pressure- and suction-side sections. The pressure-side and suction-side fins extend respectively over these pressure-side and suction-side sections of the blade, and they serve mainly to position and fasten the shield on the leading edge.

In order to improve the aerodynamic performance of blades, their leading edges are being given shapes that are ever more complex, thereby making it more complicated both to fabricate shields that need to fit those shapes closely and also to secure them on blades.

Furthermore, in the event of impacts against a blade, the shield may become at least partially loosened from the leading edge of the blade made of composite material, thereby giving rise to a reduction in the aerodynamic performance of the blade associated with degrading its airflow behavior, accompanied by an unbalance in the event of part of the shield being lost. Moreover, if a portion of the shield is torn off, the leading edge of the blade is no longer protected over its entire height, and the composite material that has been laid bare at the leading edge of the blade is subjected to attack from the external environment. The resulting profile is generally irregular, thereby also degrading its airflow behavior. It is then necessary to repair the blade and/or to replace it.

OBJECT AND SUMMARY OF THE INVENTION

The present invention seeks to remedy these drawbacks at least in part.

To this end, the invention provides a blade comprising a blade body made of organic matrix composite material reinforced by fibers and a leading edge shield made of a material that withstands point impacts better than the composite material of the blade body, the blade including a blade tip, the leading edge shield being assembled on the blade body and including a pressure-side fin and a suction-side fin, the pressure-side fin including a pressure-side tab and the suction-side fin including a suction-side tab, the pressure-side tab and the suction-side tab being folded one on the other and being secured to each other so as to form a partial covering of the blade tip.

During impacts against the leading edge shield, the presence of the pressure-side and suction-side tabs that extend the pressure-side and suction-side fins serves to reduce the risk of the shield separating, in particular close to the free edges of the leading edge shield near the blade tip, where such separations are most frequently observed. Specifically, the pressure-side and suction-side tabs are not separate pieces adhesively bonded or welded to the pressure-side and suction-side fins, so they are not separable from the pressure-side and suction-side fins. These pressure-side and suction-side tabs are made integrally with the pressure-side and suction-side fins respectively, such that in order to separate the leading edge shield from the blade body, it is necessary to loosen the pressure-side and suction-side fins from the blade body and also to loosen the pressure-side tab from the suction-side tab. The force needed to separate the leading edge shield from the blade body is thus greater. Thus, the risks of damaging the blade are reduced.

The leading edge shield may be made of titanium-based alloy.

This material presents very good ability to withstand point impacts.

The term "titanium-based alloy" is used to designate alloys in which the majority of the content by weight is titanium. It can thus be understood that titanium is the element in the alloy having the greatest content by weight. By way of example, the titanium-based alloy may have a content by weight of at least 50% titanium, preferably at least 70% titanium, more preferably at least 80% titanium.

The leading edge shield may equally well be made of steel or of a metal alloy commonly known by the registered trademark Inconel™. The term "Inconel" is used below to designate an alloy based on iron alloyed with nickel and chromium.

The pressure-side tab and the suction-side tab may be secured to each other by adhesive or by welding.

Both of these techniques are simple to perform and make it possible to guarantee that the pressure-side tab is well secured to the suction-side tab.

The pressure-side tab may be folded onto the suction-side tab.

In a turbojet fan, the blades are set into rotation inside a casing arranged around the blades. A stationary point of the casing therefore sees the pressure side of the blade go past first, followed by the suction side. Thus, since the pressure-side tab is folded onto the suction-side tab, in the event of contact between the blade tip and the casing, the risk of the pressure-side tab being separated from the suction-side tab is reduced. This arrangement for the pressure-side and suction-side tabs thus serves to reduce the risks of the pressure-side tab opening in the event of involuntary contact with the casing.

The pressure-side tab or the suction-side tab may be secured to the blade tip.

The tab arranged between the blade tip and the other tab is also secured to the blade tip, e.g. by adhesive. This secures the pressure-side and suction-side tabs better with the blade tip.

The pressure-side fin and the suction-side fin each includes a free edge, one of the pressure-side and suction-side fins may be longer than the other, and the tab of the longer fin may include a cutout starting from the free edge of the longer fin and going towards the free edge of the shorter fin.

This cutout in the longer fin provides a transition at the blade tip between the free end of the longer fin and the free end of the shorter fin on the blade tip.

At least a portion of the cutout may have a radius of curvature.

The radius of curvature of the cutout serves to minimize any local stress concentration that might be present along the cutout in the event of the cutout presenting a sudden change in direction. The cutout is not just a straight line between the free edge of the longer fin and the free edge of the shorter fin on the blade tip. The cutout may present a radius of curvature that varies along the cutout. Also, the cutout may present a first portion running along the edge formed by the blade tip and a rectilinear second portion going to the free edge of the shorter fin, these two portions being united by a portion presenting a radius of curvature that is small relative to the other two portions, i.e. a portion of considerable curvature. The cutout may also present a portion that is rectilinear and a portion that has a radius of curvature. The portion having a large radius of curvature may be preceded and/or followed by portions that are rectilinear or portions that have small radii of curvature.

The tab of the shorter fin may include a projection starting from the free edge of the shorter fin and going towards the free edge of the longer fin.

The projection of the shorter fin serves to provide a transition between the free edge of the longer fin and the free edge of the shorter fin on the blade tip. The shape of the projection may correspond to the shape of the cutout in the longer fin so that the partial covering of the blade tip presents thickness that is constant over its entire area, the thickness of the partial covering being equal to the sum of the thickness of the suction-side tab plus the thickness of the pressure-side tab. Furthermore, because of its projection, the contact area between the pressure-side tab and the suction-side tab is increased. It is thus possible to increase the bonding area between the pressure-side and suction-side tabs.

The blade body may include a housing at the blade tip for receiving the pressure-side tab and/or the suction-side tab. Thus, the surface of the blade tip is plane and the blade does not present any extra thickness at the blade tip as a result of folding the pressure-side tab and the suction-side tab.

The invention also provides a turbojet including a fan having a plurality of blades as defined above.

The invention also provides a method of fabricating a blade as defined above, the method comprising the following steps:
  assembling the leading edge shield on the blade body;
  folding the suction-side tab onto the blade tip;
  folding the pressure-side tab onto the suction-side tab; and
  securing the suction-side tab and the pressure-side tab to each other by adhesive or by welding.

The suction-side tab may be adhesively bonded to the blade tip.

BRIEF DESCRIPTION OF THE DRAWINGS

Other characteristics and advantages of the invention appear from the following description of embodiments of the invention, given as nonlimiting examples, and with reference to the accompanying figures, in which:

FIGS. 8A and 8B are fragmentary diagrammatic views of a rotary blade in a third embodiment of the blade; and FIGS. 9 and 10 are fragmentary diagrammatic views of a rotary blade in fourth and fifth embodiments of the blade.

DETAILED DESCRIPTION OF THE INVENTION

Figure 1:
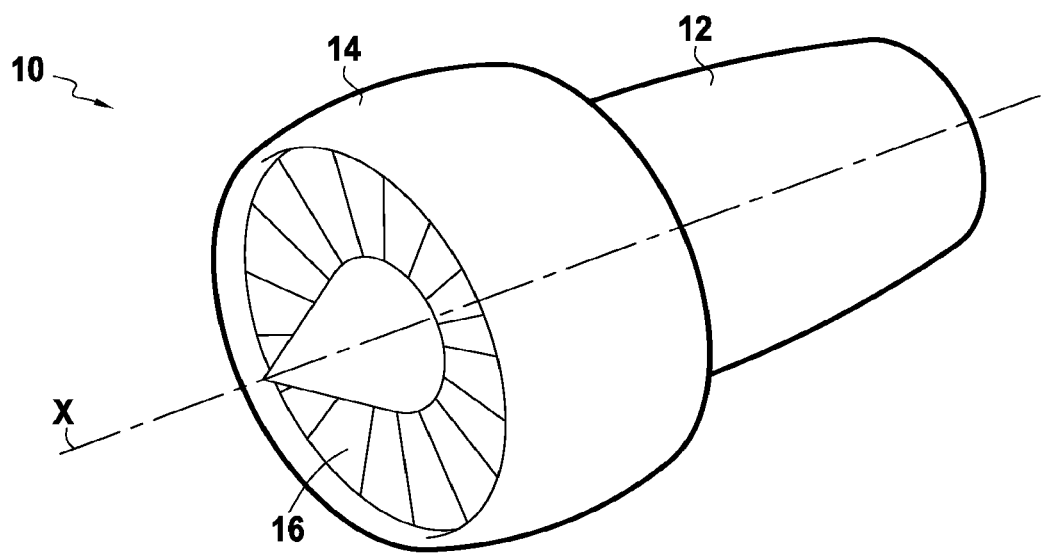
FIG. 1 is a diagrammatic perspective view of a bypass turbojet.
Figure 2:
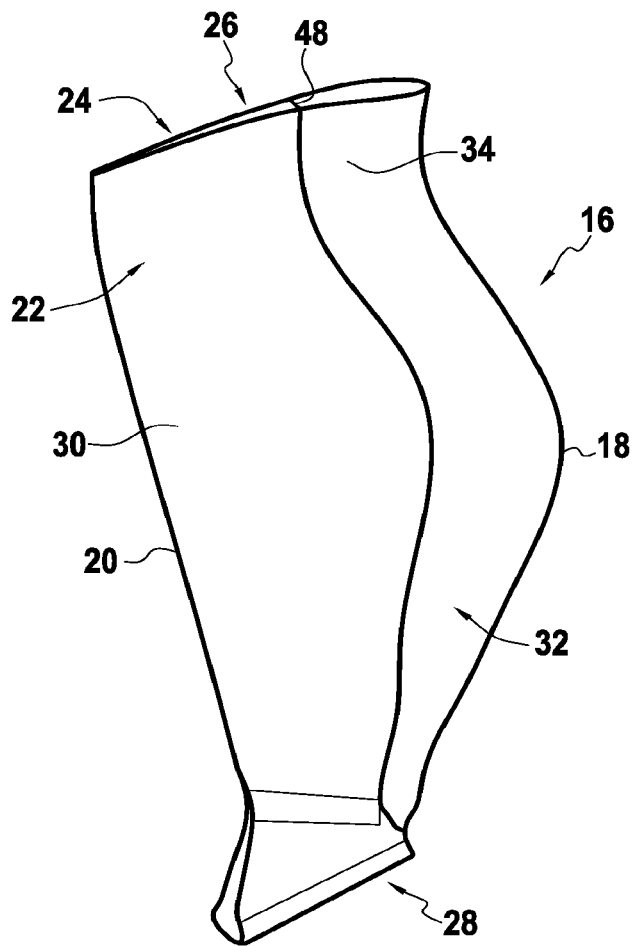
FIG. 2 is a diagrammatic perspective view of the pressure side of a rotary blade of the fan of the FIG. 1 turbojet in a first embodiment of the blade.
Figure 3:
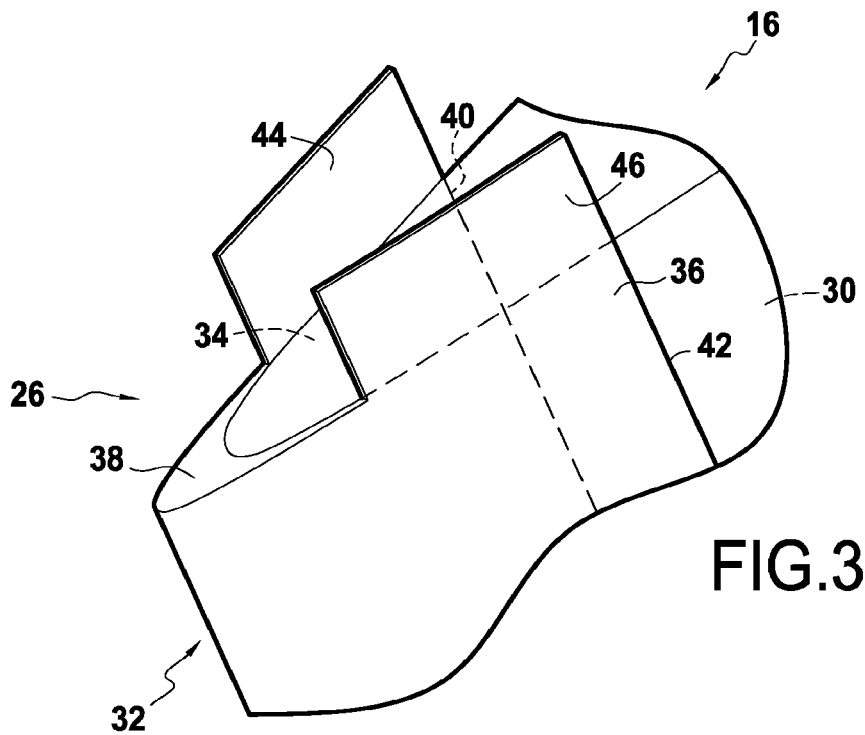
FIG. 3 is a fragmentary diagrammatic perspective view of the FIG. 2 blade prior to folding the tabs.
Figure 4:
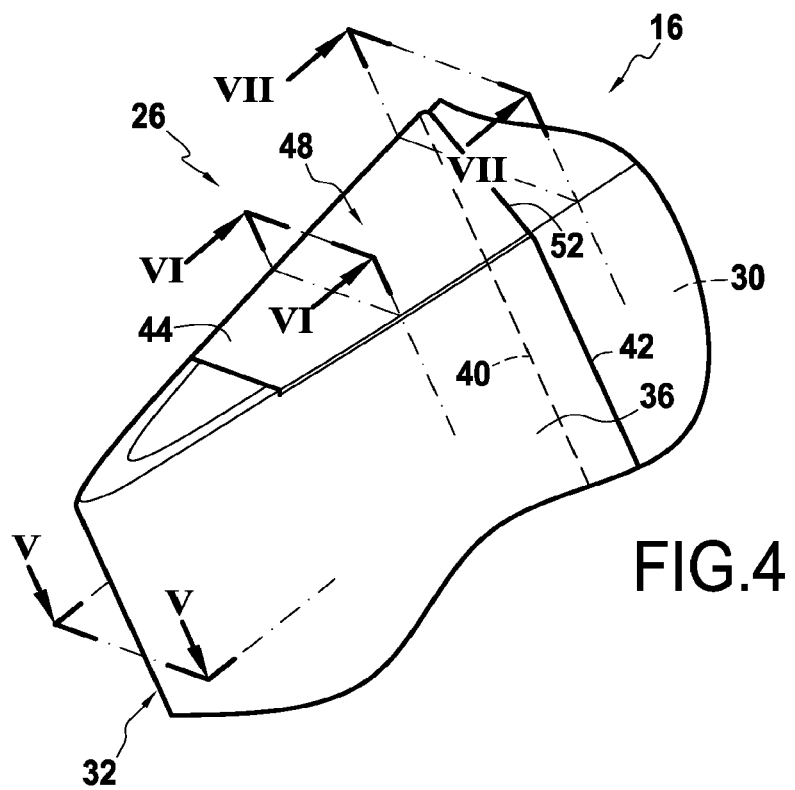
FIG. 4 is a fragmentary diagrammatic perspective view of a rotary blade in a second embodiment of the blade.

FIG. 1 shows a bypass turbojet 10 having a gas generator unit 12 and a fan 14. The fan 14 has a plurality of rotary blades 16, that are arranged radially around a central axis X, and that have aerodynamic profiles suitable for impelling air as a result of rotating. Thus, as shown in FIGS. 2 and 3, each blade 16 presents a leading edge 18, a trailing edge 20, a pressure side 22, a suction side 24, a blade tip 26, and a blade root 28.

In normal operation, the relative airflow is oriented substantially towards the leading edge 18 of each blade 16. Thus, the leading edge 18 is particularly exposed to impacts. In particular, when the blade 16 has a blade body 30 that is made of composite material, in particular of organic matrix composite material, e.g. a fiber-reinforced polymer, it is appropriate to protect the leading edge 18 with a leading edge shield 32 that is integrated with each blade. In other words, the leading edge shield 32 is assembled on the blade body 30.

The leading edge shield 32 is made out of a material that withstands point impacts better than does the composite material of the blade body 30. The leading edge shield 32 is mainly made of metal, and more specifically out of a titanium-based alloy, such as for example TA6V (Ti-6Al-4V). The leading edge shield 32 may equally well be made of steel or of a metal alloy commonly known by the registered trademark Inconel™. The term "Inconel" is used below to designate an alloy based on iron alloyed with nickel and chromium.

The leading edge shield 32 has a pressure-side fin 34, a suction-side fin 36, and a central section 38 that is thicker, that connects together the pressure-side fin 34 and the suction-side fin 36, and that is to be placed astride an edge of the blade body 30. The pressure-side and suction-side fins 34 and 36 serve to position the shield 32 on the blade body 30. The pressure-side and suction-side fins 34 and 36 present respective free edges 40 or 42, and in FIG. 3, they are of equal lengths.

Furthermore, the pressure-side fin 34 includes a pressure-side tab 44, and the suction-side fin 36 includes a suction-side tab 46. The pressure-side tab 44 and the pressure-side tab 46 are made integrally with the pressure-side fin 34 and with the suction-side fin 36, respectively.

In FIG. 2, the pressure-side and suction-side tabs 44 and 46 are shown folded one on the other so as to form a partial covering 48 on the blade tip 26. Also, the pressure-side tab 44 is secured to the suction-side tab 46, e.g. by adhesive or by welding.

The method of fabricating the blade 16 includes a first step of assembling the shield on the leading edge 32 of the blade body 30, as shown in FIG. 3. The method also includes a step of folding the suction-side tab 46 onto the blade tip 26 and a step of folding the pressure-side tab 44 onto the suction-side tab 46, the suction-side tab 46 and the pressure-side tab 44 being secured to each other by adhesive or by welding.

The method of fabricating the blade 16 may also include a step during which the tab arranged between the blade tip 26 and the other tab is also secured to the blade tip 26, e.g.

by adhesive. In the present example, the suction-side tab 46 may be adhesively bonded to the blade tip 26.

Once the shield has been assembled on the leading edge 32 of the blade body 30, the blade 16 may also be fabricated by folding firstly the pressure-side tab 44 onto the blade tip 26, and then folding the suction-side tab 46 onto the pressure-side tab 44. When the pressure-side tab 44 is folded initially onto the blade tip 26, it is possible to envisage adhesively bonding the pressure-side tab 44 to the blade tip 26. The pressure-side tab 44 and the suction-side tab 46 are secured by adhesive or by welding.

Below, elements that are common to the various embodiments are identified by the same numerical references.

Figure 5:
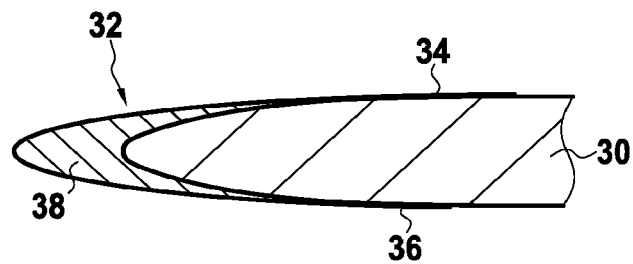
FIGS. 5 to 7 are fragmentary section views of the FIG. 4 blade respectively on planes V-V, VI-VI, and VII-VII.
Figure 6:
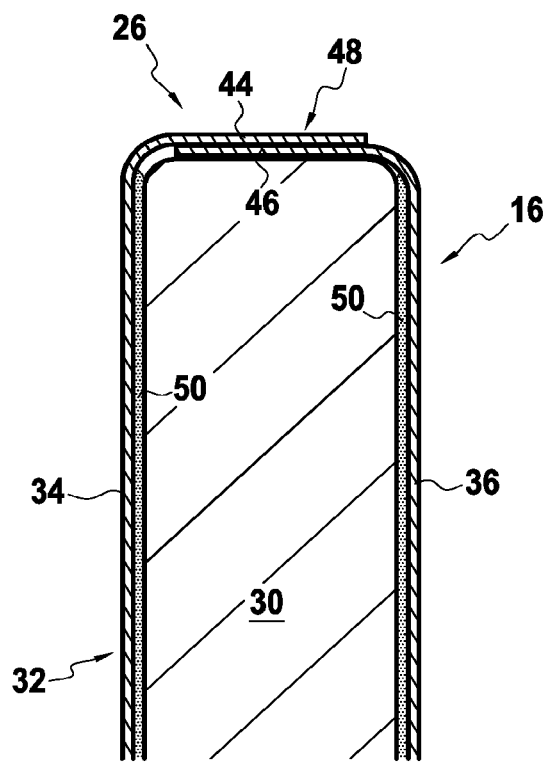
Figure 7:
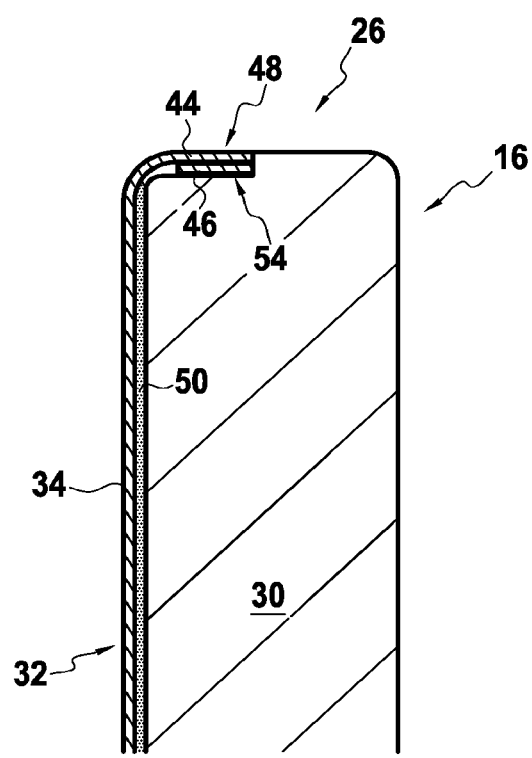

FIGS. 4 to 7 show a second embodiment of the blade 16 in which the pressure-side fin 34 is longer than the suction-side fin 36, as can be seen in particular in FIG. 5.

Furthermore, in the embodiment of FIGS. 4 to 7, the pressure-side tab 44 is folded onto the suction-side tab 46. The pressure-side tab 44 and the suction-side tab 46 are secured to each other by adhesive or by welding. They form a partial covering 48 on the blade tip 26. The suction-side tab 46 may be adhesively bonded to the blade tip 26.

The pressure-side tab 44 also has a cutout 52 starting from the free edge 40 of the pressure-side fin 34 and going towards the free edge 42 of the suction-side fin 42 when the pressure-side tab 44 and the suction-side tab 46 are folded one on the other on the blade tip 26.

In the embodiment of FIGS. 4 to 7, the blade body 30 includes a housing 54 at the blade tip 26 for receiving the pressure-side tab 44 and the suction-side tab 46 in such a manner that the blade tip 26 presents a surface that is smooth and does not present extra thickness at the partial covering 48 of the blade tip 26.

FIGS. 8A and 8B show a third embodiment of the blades 16 in which the pressure-side fin 34 is longer than the suction-side fin 36, with the pressure-side tab 44 being folded onto the suction-side tab 46. The pressure-side tab 44 has a cutout 52 starting from the free edge 40 of the pressure-side fin 34 and going towards the free edge 42 of the suction-side fin 42 when the pressure-side tab 44 and the suction-side tab 46 are folded one on the other on the blade tip 26. Furthermore, The pressure-side tab 46 has a projection 56 starting from the free edge 42 of the suction-side fin 36 and going towards the free edge 40 of the pressure-side fin 34 when the pressure-side tab 44 and the suction-side tab 46 are folded one on the other on the blade tip 26.

In this embodiment of FIGS. 8A and 8B, the cutout 52 is curved, i.e. the cutout 52 has at least one radius of curvature. The radius of curvature may vary along the cutout 52 in the free edge 40 of the pressure-side fin 34 going towards the free edge 42 of the suction-side fin 36, or it may be constant.

Furthermore, the blade body 30 does not have a housing for receiving the pressure-side and suction-side tabs 44 and 46, such that the pressure-side and suction-side tabs 44 and 46 form extra thicknesses on the blade tip 26 in the partial covering 48 of the blade tip 26.

FIG. 9 shows an embodiment of the blades 16 similar to the embodiment of FIGS. 8A and 8B, but that differs in that the cutout 52 presents a first portion 58 that starts from the free edge 40 of the pressure-side fin 34 and that runs along the edge of the blade tip 26, and a second portion 62 that is rectilinear, extending to the free edge 42 of the suction-side fin 36, with the first portion 58 and the rectilinear second portion 62 being connected together by a third portion 40 that presents a radius of curvature that is small compared with the other portions 58 and 62, i.e. the third portion 60 is curved more strongly than the other portions of the cutout 52.

FIG. 10 shows an embodiment of the blades 16 in which the suction-side fin 36 is longer than the pressure-side fin 34.

Although the present invention is described with reference to specific embodiments, it is clear that various modifications and changes may be undertaken on those embodiments without going beyond the general ambit of the invention as defined by the claims. Thus, individual characteristics of the various embodiments mentioned above may be combined in additional embodiments. Consequently, the description and the drawings should be considered in a sense that is illustrative rather than restrictive.

In particular, a cutout 52 presenting a portion having a radius of curvature may be combined with a housing for receiving the pressure-side and suction-side tabs. The reception housing may receive only one of the two tabs. The reception housing may receive both tabs in one portion of the reception housing, while receiving only one tab in the other portion of the reception housing, e.g. when the tab of the shorter fin does not present a projection.

The invention claimed is:

1. A blade comprising:
   a blade body made of organic matrix composite material reinforced by fibers; and
   a leading edge shield made of a material that withstands point impacts better than the composite material of the blade body, the blade including a blade tip, the leading edge shield being assembled on the blade body and including a pressure-side fin and a suction-side fin,
   wherein the pressure-side fin includes a pressure-side tab and the suction-side fin includes a suction-side tab, the pressure-side tab and the suction-side tab being folded flat on each other and onto the blade tip such that a first surface of one of the pressure-side tab and the suction-side tab abuts the blade tip, a second surface of the one of the pressure-side tab and the suction-side tab abuts a first surface of the other of the pressure-side tab and the suction-side tab, and a second surface of the other of the pressure-side tab and the suction-side tab is free, the second surfaces of the pressure-side tab and the suction-side tab being opposite of the first surfaces of the pressure-side tab and the suction-side tab, respectively, and the pressure-side tab and the suction-side tab being secured to each other so as to form a partial covering of the blade tip, and
   wherein the pressure-side fin and the suction-side fin each includes a free edge, one of the pressure-side and suction-side fins being longer than the other, and the tab of the longer fin including a cutout starting from the free edge of the longer fin and going towards the free edge of the shorter fin.

2. The blade according to claim 1, wherein the pressure-side tab and the suction-side tab are secured to each other by adhesive or by welding.

3. The blade according to claim 1, wherein the pressure-side tab is folded onto the suction-side tab.

4. The blade according to claim 1, wherein the pressure-side tab or the suction-side tab is secured to the blade tip.

5. The blade according to claim 1, wherein at least a portion of the cutout has a radius of curvature.

6. The blade according to claim 1, wherein the tab of the shorter fin includes a projection starting from the free edge of the shorter fin and going towards the free edge of the longer fin.

7. The blade according to claim 1, wherein the blade body includes a housing at the blade tip for receiving at least one of the pressure-side tab or the suction-side tab.

8. The blade according to claim 7 wherein the blade tip presents a surface that is smooth and does not present an extra thickness at the partial covering of the blade tip.

9. A turbojet including a fan having a plurality of blades according to claim 1.

10. A method of fabricating the blade according to claim 1, the method comprising:
   assembling the leading edge shield on the blade body;
   folding the suction-side tab onto the blade tip;
   folding the pressure-side tab onto the suction-side tab; and
   securing the suction-side tab and the pressure-side tab to each other by adhesive or by welding.

11. The blade according to claim 1, wherein the blade tip is flat.

\* \* \* \* \*